(12) United States Patent
Berstis

(10) Patent No.: US 6,801,911 B1
(45) Date of Patent: Oct. 5, 2004

(54) DATA PROCESSING SYSTEM AND METHOD FOR ACCESSING FILES

(75) Inventor: Viktors Berstis, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 999 days.

(21) Appl. No.: 08/976,888

(22) Filed: Nov. 21, 1997

(51) Int. Cl.[7] ............................................. G06F 17/30
(52) U.S. Cl. ............................. 707/10; 707/2; 707/102; 707/104
(58) Field of Search .......................... 707/10, 104, 4, 707/2, 102; 395/200.31, 200.48, 187.01, 200.58, 200.47; 713/201

(56) References Cited

U.S. PATENT DOCUMENTS

| | | | | |
|---|---|---|---|---|
| 5,633,472 A | | 5/1997 | DeWitt et al. ................. 84/602 |
| 5,696,898 A | * | 12/1997 | Baker et al. ............ 395/187.01 |
| 5,701,465 A | * | 12/1997 | Baugher et al. .............. 707/10 |
| 5,706,502 A | * | 1/1998 | Foley et al. ................... 707/10 |
| 5,774,660 A | * | 6/1998 | Brendel et al. ......... 395/200.31 |
| 5,781,908 A | * | 7/1998 | Williams et al. ............. 707/104 |
| 5,835,718 A | * | 11/1998 | Blewett .................. 395/200.48 |
| 5,848,246 A | * | 12/1998 | Gish ...................... 395/200.58 |
| 5,848,410 A | * | 12/1998 | Walls et al. ..................... 707/4 |
| 5,848,413 A | * | 12/1998 | Wolff .......................... 707/10 |
| 5,878,219 A | * | 3/1999 | Vance, Jr. et al. ...... 395/200.47 |
| 5,987,611 A | * | 11/1999 | Freund ........................ 713/201 |

FOREIGN PATENT DOCUMENTS

EP  0 770 966 A2  5/1997

OTHER PUBLICATIONS

Martin Hall et al., *Windows Sockets*, "An Open Interface for Network Programming under Microsoft Windows", Version 1.1, Jan. 20, 1993, pp. 1–147.

* cited by examiner

*Primary Examiner*—Thuy N. Pardo
(74) *Attorney, Agent, or Firm*—Winstead Sechrest & Minick P.C.; Jeffrey S. LaBaw

(57) ABSTRACT

A data processing system and method are provided for using URLs to access files located on the Internet in a similar manner used to access local files.

28 Claims, 3 Drawing Sheets

DATA PROCESSING SYSTEM AND METHOD FOR ACCESSING FILES

TECHNICAL FIELD

The present invention relates in general to a file system in a communication network, and more particularly, to the use of uniform resource locators to access the file system in the communication network.

BACKGROUND INFORMATION

Various file systems are currently implemented for data processing systems in a variety of networks. Most users are familiar with a methodology for accessing a file in a file system implemented on their personal computer (PC). When accessing that file, the user opens the file, reads or writes from the file, and then closes the file. To open the file to communicate information thereto, the user must first specify the name of the file. Generally, for personal computers, the file name is specified in a file system open call where one of the arguments is the name of the file in the form of a character string:

a:\pathname\filename

In the call provided above, the "a" indicates a drive in which the file is located. The "pathname" indicates a name of a folder or directory in which the file is located and the "filename" is a name of the file itself.

When a central processing unit (CPU) in a PC receives such a name, the central processing unit first accesses the drive, and locates a folder directory specified by the pathname. Subsequently, the CPU searches the folder or directory for the file corresponding to the filename specified in the user's call.

When a programmer desires to use a file or device, the programmer passes the name of that file or device as a parameter to an "open" call along with possible other parameters. The other parameters may, for example, indicate what kind of sharing may be permissible. Files, in general, are specified using "path names". For example, an open call with the name:

a:\dir1\dir2\filename.ext, specifies that the file is on drive "a," with the filename being "filename.ext" in directory "dir2," in directory "dir1," of the root of drive "a". Devices often use reserved file names such as: LPT1 for Printer 1; COM1 for Serial Communications Port 1; and CON for the console keyboard and display, among others.

The "open" call locates the file on the hard drive or other device and creates a data structure in memory, usually called a "file control block" which contains detailed information about the physical location of the file or device specified, as well as information such as the current position in the file when the file is being read sequentially.

The operating system returns a "handle" from the open call and the handle is then used to locate the file control block for use on future "calls." These future calls include reading/writing from/to the file or device. For example a "read" call would typically have four parameters: a handle, a location of data buffer into which to place the read data, the size of this buffer, and a place to store the amount of data actually written into the data buffer. Similarly, a "write" call would typically have the following four parameters: a handle, the location of the data buffer containing the data to be written, the number of bytes to be written, and a place to store the amount of data actually written (in case not all of the requested bytes to be written are written because the media is full). Additionally, there may be several other related calls such as those for setting the position of the next read or write operation in the file specified by the handle, and perhaps some special "calls" set forth when additional functions may be possible for a given file or device. Such special calls may include ejecting a CD or rewinding a tape.

Finally, when the program has finished using the file or device specified by the handle, a "close" call is made to deallocate the file control block and any other operating system buffers that may have been allocated to process the input/output activity for the file.

As users became more comfortable with personal computers and with the techniques used to access data therein, including the previously described file access techniques, use of personal computers became increasingly common place. Today, a worldwide network of computers exists to allow users on different personal computers to communicate with one another. Indeed, the worldwide network of computers, commonly known as the "Internet," has seen explosive growth in the last several years. This growth has been typically fueled by the introduction and widespread use of "web" browsers that allow for simple graphical user interface-based access to network servers. Such network servers typically support documents formatted as "web pages." The "World Wide Web" (www) is a collection of servers on the Internet that utilize the Hypertext Transfer Protocol (HTTP), a known application protocol that provides users access to files using a standard page description language referred to as HyperText Markup Language (HTML). It should be noted that files may be provided in different formats such as text, graphics, images, sound, and video, among others. HTML provides basic document formatting and allows a developer to specify "links" to other servers and files. Use of an HTML-compliant client browser involves specification of a link via a Uniform Resource Locator, commonly known by the acronym, "URL." Upon specification of a URL, a client may make a TCP/IP (Transmission Control Protocol/Internet Protocol) request to the server identified in the link and receive a "web page" in return, where the "web page" is a document formatted according to HTML.

It should be noted that the Internet typically includes a large network of web sites that are accessible by clients, wherein the client is typically a user and his personal computer. Clients may access the Internet through a private Internet access provider, an on-line service provider, or a personal access or service provider. It should be noted that such access providers and service providers will hereinafter be collectively referred to as "web servers." Additionally, it should be noted that web servers may also be found at web sites. Each site selectively operates a "web site" that supports files in the form of documents or pages.

A network path to a server is identified by a URL having a known syntax for defining a network connection. This URL typically has the form of:

http://domain name/directory path/filename.

It should be noted that "http" identifies a type of Internet protocol used for storage and transmission of information. Alternatives to an HTTP format include Gopher, Telnet, FTP (File Transfer Protocol), and Usenet News. Furthermore, it should be noted that a URL occasionally includes a port number that is placed directly after the domain name. Such URLs provide a consistent, easily understood method of addressing different files of data at Internet or World Wide Web sites.

When the client receives an URL having one of the aforementioned forms, a central processing unit within the client must open a connection to the server using the TCP/IP protocol. A first step in opening this communication requires the central processing unit to open a "socket." Sockets (aka Berkeley Sockets, or Winsock) is an application programming interface (API) commonly used to access the Internet.

Generally, to "open a socket" the next three steps are taken. A socket is first allocated. Next, a socket is "bound" to a local address that identifies the client. The socket is then "connected" to a remote host, usually a server. Data is "received" and "sent" (using receive and send calls) between the client and host as needed according to HTTP, FTP . . . or another communication protocol. The communication protocol establishes the format of the request data that is sent to the server and the format of returned data. Finally, a socket is "closed".

API's other than "sockets" are available for accessing the Internet such as TLI, XTI and others at various levels in a communication stack of software. However, regardless of the communication protocol used, the basic principles remain the same and may be used to implement alternate embodiments of the present invention.

In one example, if a URL is specified such as:

http://www.company.com/index.html is to accessed, the HTTP protocol will be used. "www.company.com" is resolved into a 32 bit Internet Protcol (IP) address. Since no explicit port number is specified, the default for http, "80," is used. A socket is then opened to connect this IP address using port 80. Next, a formatted request is sent to the server asking for file "/index.html". If such a file exists at the server and is permitted to be sent to the client, the file is sent and is preceded by formatted header information set forth in the HTTP protocol (RFC1945).

Thus, the use of a URL to access the data from a web site corresponds to the use of the "a:\pathname\filename" convention for accessing a file within a personal computer. However, the use of Internet files or content in a personal computer application requires that the programmer understand and implement all of the Internet protocols that may be referenced by a URL. Thus, when a developer is programming a personal computer to execute both Internet and Intranet applications, the programmer must ensure that many Internet interfaces are utilized in order to facilitate the access of information over the Internet, as well as files available via the Intranet.

Therefore, a need exists for a data processing system and method that does not require the use of such different interfaces to access applications via the Internet and via a local Intranet.

SUMMARY OF THE INVENTION

The previously mentioned needs are fulfilled with the present invention. Accordingly, there is provided, in a first form, a computer program product in the computer-readable medium for implementing an operating system on a local data processing system. The computer program product includes an input device for receiving a command to access a first file and a device for evaluating the command to determine a first file type of the first file. The computer program product also includes a device for retrieving the first file from a remote data processing system when the first file type indicates the first file is stored outside the local data processing system.

Additionally, there is provided, in a second form, a data processing system. The data processing system includes a communication interface for selectively enabling the data processing system to communicate with a remote data processing system and a local memory. The data processing system also includes an input device for receiving a command to access a first file and a central processing unit for executing an operating system. The operating system evaluates the command to determine when the first file is stored in the local memory and when the first file is stored in the remote data processing system.

Furthermore, there is a provided, in the third form, a method for implementing an operating system on a local data processing system. The method includes the step of receiving a command to access a first file and evaluating the command to determine a first type of the first file. The method also includes the step of retrieving the first file from a remote data processing system when the first file type indicates the first file is stored outside the local data processing system.

These and other features, and advantages, will be more clearly understood from the following detailed description taken in conjunction with the accompanying drawings. It is important to note the drawings are not intended to represent the only form of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
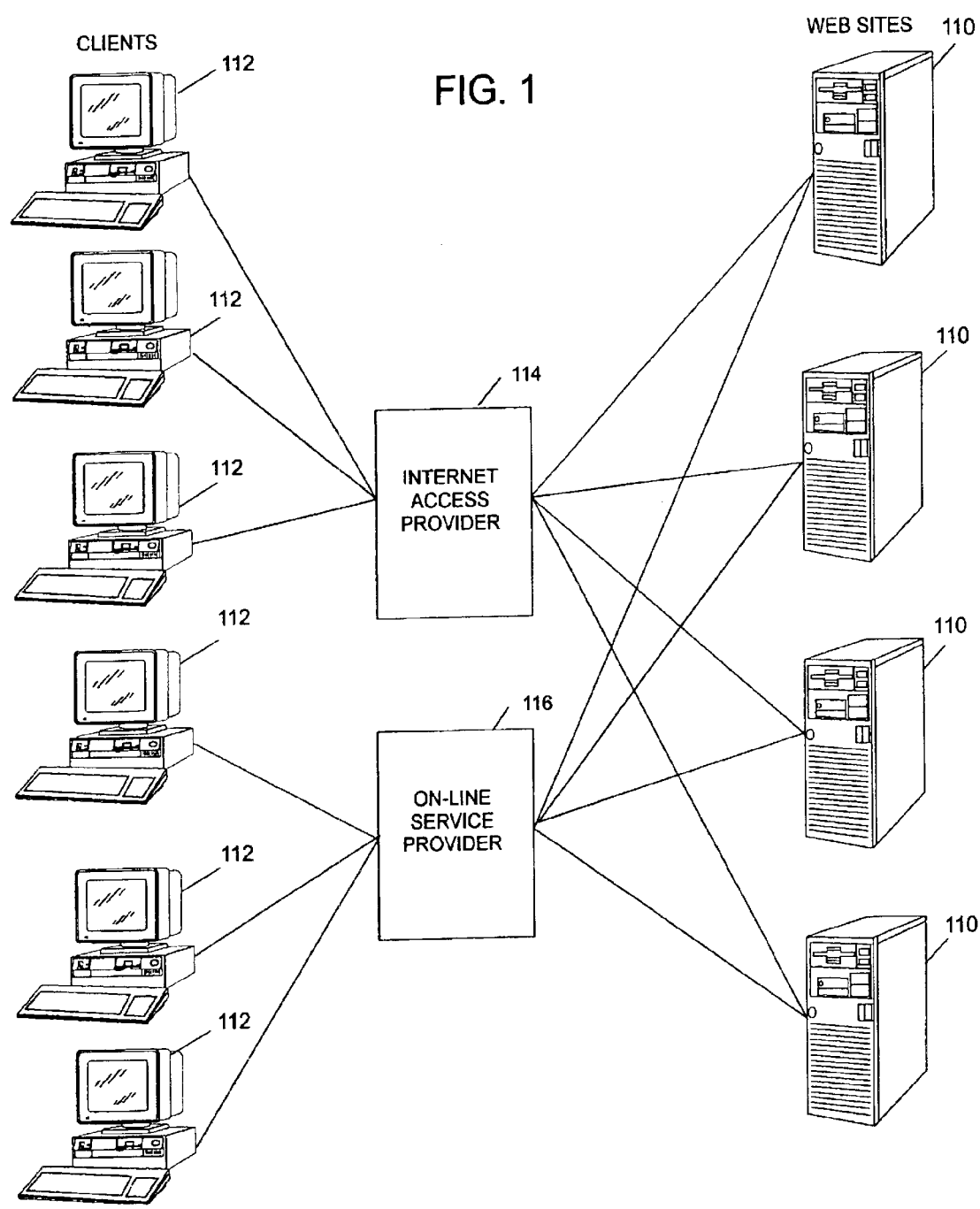
FIG. 1 illustrates, in block diagram form, a communication network in accordance with one embodiment of the present invention.

The present invention implements a data processing system and method for accessing files on an external network using an external addressing protocol within the existing file system. In one embodiment of the present invention, the external network comprises the Internet and the external addressing protocol comprises a URL. It should be noted, however, that the concept of the present invention may also be implemented on other forms of external communication networks and other addressing techniques. The present invention generates references to Internet files and their content such as those a user or programmer of a personal computer may access such Internet files in a substantially similar manner to that used to access files on a local hard drive. When the mechanism provided by the present invention is implemented, applications written for the personal computer do not require the applications programmer to handle a myriad of Internet protocols typically required to access this information. Furthermore, previously written applications may be automatically enabled for Internet file access without requiring significant modifications when the present invention is implemented.

Operation and implementation of the present invention will subsequently be described in greater detail. Prior to that description, however, an environment in which the present invention may be implemented will be set forth. In the following description, numerous specific details will be set forth to provide a thorough understanding of the present invention. However, it will be obvious to those skilled in the art that the present invention may be practiced without such specific details. In other instances, well-known devices have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

A general environment in which the communication network and methodology of the present invention may be implemented in illustrated in FIG. 1. FIG. 1 illustrates a communication network based on a client-server model typically utilized in the Internet. Conceptually, the Internet comprises a large network of "sites" 110 that are accessible by "clients" 112. Each of the plurality of clients 112 is typically the user and his personal computer. Clients 112 access the Internet through some private Internet access provider 114 (such as Advantis™) or an on-line service provider 116 (such as America On-Line™, Prodigy, Microsoft Network™, and the like). Access provider 114 and service provider 116 will hereinafter be collectively referred to as the web servers. Furthermore, it should be noted that web servers may also be found at web sites. Alternatively, clients 112 may have a direct connection to each or a portion of the plurality of sites 110. Each of the clients 112 may run a "browser," which is a known software tool used to access the sites 110 via the web servers (114 and 116). Each site 110 selectively operates a "web site" that supports files in the form of documents and pages. A network path to a server is identified by a uniform resource locator (URL) having a known syntax for defining a network connection. As previously mentioned, URLs may be utilized to specify a link from the user to another server or file. Upon specification of a link, one of the clients 112 makes a TCP/IP request using HTTP to one of the plurality of sites 110 identified in the link and receives a web page (generally, a document formatted according to HTML) in return. In some applications, web pages may also be formatted in dynamic HTML or XML.

Figure 2:
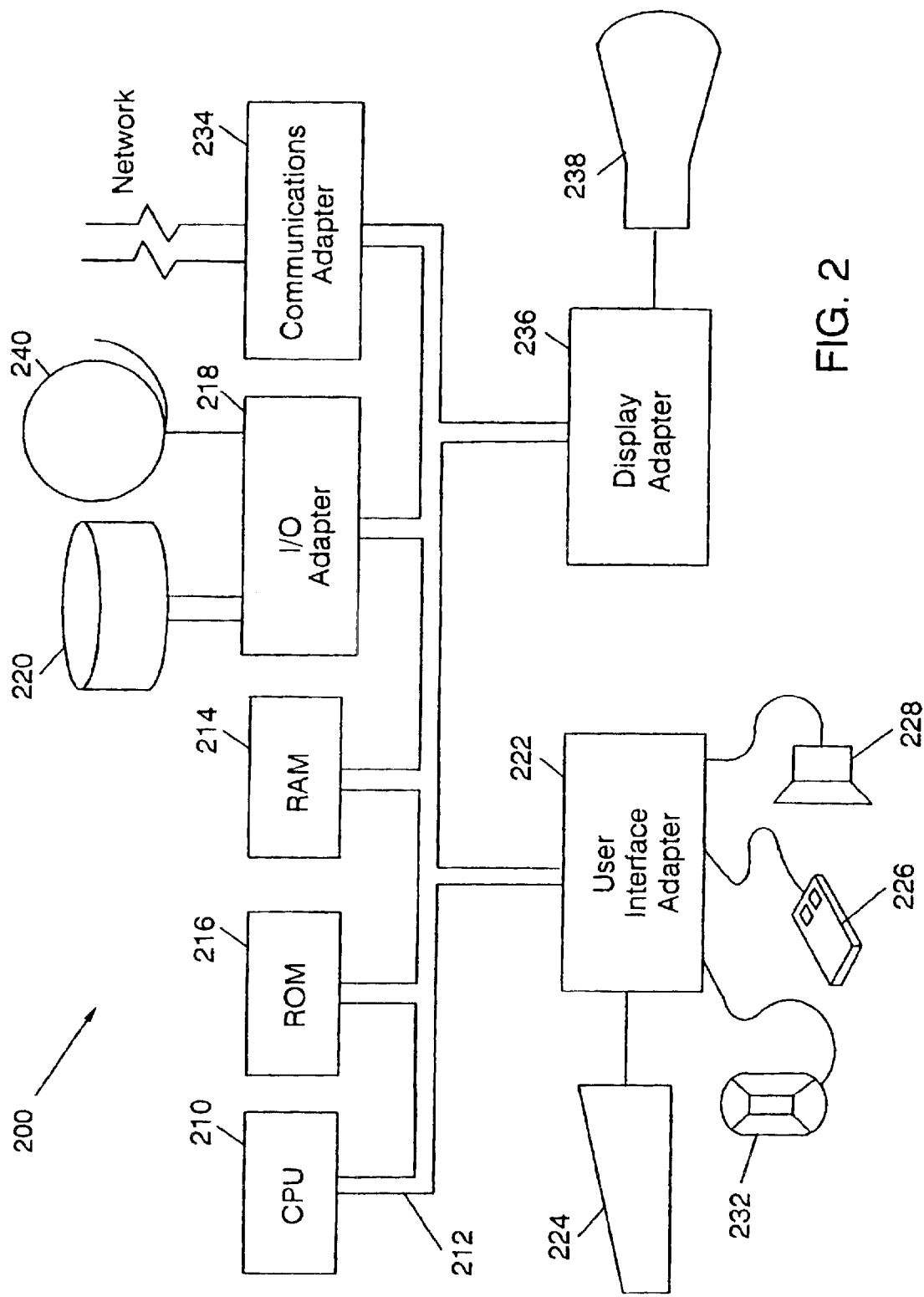
FIG. 2 illustrates, in block diagram form, a data processing system implemented in accordance with one embodiment of the present invention.

FIG. 2 illustrates a data processing system that may be implemented by one of the plurality of clients 112. Referring to FIG. 2, an example is illustrated of a data processing system 200 that may be used in one embodiment of the present invention. Referring first to FIG. 2, an example is shown of a data processing system 200 which may be used for the invention. The system has a central processing unit (CPU) 210, such as a PowerPC microprocessor ("PowerPC" is a trademark of IBM Corporation) according to "The PowerPC Architecture: A Specification for a New Family of RISC Processors", 2d Edition, 1994, Cathy May, et al. Ed., which is hereby incorporated herein by reference. A more specific implementation of a PowerPC microprocessor is described in the "PowerPC 604 RISC Microprocessor Users Manual", 1994, IBM Corporation, which is hereby incorporated herein by reference. The CPU 210 is coupled to various other components by system bus 212. Read only memory ("ROM") 216 is coupled to the system bus 212 and includes a basic input/output system ("BIOS") that controls certain basic functions of the data processing system 200. Random access memory ("RAM") 214, I/O adapter 218, and communications adapter 234 are also coupled to the system bus 212. I/O adapter 218 may be a small computer system interface ("SCSI") adapter that communicates with a disk storage device 220. Communications adapter 234 interconnects bus 212 with an outside network enabling the data processing system to communication with other such systems. Input/Output devices are also connected to system bus 212 via user interface adapter 222 and display adapter 236. Keyboard 224, track ball 232, mouse 226 and speaker 228 are all interconnected to bus 212 via user interface adapter 222. Display monitor 238 is connected to system bus 212 by display adapter 236. In this manner, a user is capable of entering input to the system throughout the keyboard 224, trackball 232 or mouse 226 and receiving output from the system via speaker 228 and display 238. Additionally, an operating system such as AIX ("AIX" is a trademark of the IBM Corporation) is used to coordinate the functions of the various components shown in FIG. 2.

Preferred implementations of the invention include implementations as a computer system programmed to execute the method or methods described herein, and as a computer program product. According to the computer system implementation, sets of instructions for executing the method or methods are resident in the random access memory 214 of one or more computer systems configured generally as described above. Until required by the computer system, the set of instructions may be stored as a computer program product in another computer memory, for example, in disk drive 220 (which may include a removable memory such as an optical disk or floppy disk for eventual use in the disk drive 220). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

Implementation of the present invention within the communication network of FIG. 1 and the data processing system of FIG. 2 will now be provided. In a first step 302 of FIG. 3, central processing unit (CPU) 210 of data processing system 200 within one of the plurality of clients 112 receives a command to open a file. Such commands may be entered via one of the plurality of user input devices (224, 226, and 232 of FIG. 2), analyzed by user interface adapter 222, and subsequently provided to CPU 210. In one embodiment of the present invention, the file may be specified by a string having the form of:

a:\pathname\filename.

In the alternative, the open command may access a file in the Internet using a URL format, such as:

http://domain name/directory path/filename.

CPU 210 next determines a type of file specified in the open command in a step 304. CPU 210 determines the type of file by parsing the string specifying a file name or URL passed to the "open" call to determine a format thereof. If CPU 210 detects a drive name, such as "a:" first, then CPU 210 determines that the open command is accessing a file local to data processing system 200. Subsequently, CPU 210 provides data and control signals necessary to access the file within its local Intranet or internal to data processing system 200 itself. CPU 210 parses and analyzes the open command to determine a drive, a path, and a file to access in a step 306. Accessibility of a file is well-known to those with skill in the data processing art and, therefore, will not be described in greater detail herein.

However, if the name specified in the command indicates a URL, rather than a file on the Intranet of data processing system 200, CPU 210 first parses the URL to determine a transfer protocol. As previously mentioned, such transfer protocols may include the Hypertext Transfer Protocol (HTTP), which is a type of Internet protocol used for transmission of information. CPU 210 determines that an HTTP transfer protocol should be used with the URL begins with the prefix "http://." Other transfer protocols include Gopher, Telnet, FTP, and Usenet. It should be noted that Gopher is a menu-oriented system for finding and retrieving information and computer files. CPU 210 may determine that the transfer protocol is Gopher when the URL has the prefix "gopher://." Telnet is a system connecting to, and using, remote computer systems. CPU 210 may detect a Telnet transfer protocol when the URL has a prefix such as "telnet://." Additionally, an FTP (File Transfer Protocol) may also be detected by CPU 210 when the prefix to the URL is "ftp://." FTP is an Internet system for storing and distributing computer files. Alternatively, CPU 210 may detect a Usenet news group when the URL has a prefix such as "news://." Usenet news groups are a public message posting and discussion system that is accessible in a different format from other URLs. Additionally, it should be noted that other transfer protocols may also be detected by CPU 210.

In response to determination of the transfer protocol in a step 308, CPU 210 provides the control and data signals required to open a socket in a step 310. CPU 210 provides the appropriate data and control signals to communications adapter 234 to enable communications between data processing system 200 within one of the plurality of clients 112 and one of the web servers using a communications protocol specified by the transfer protocol.

Subsequently, in a step 312, the client transmits or requests information from one of the plurality of web sites via the web server using an appropriate transfer protocol in a step 312. In a step 314, client 112 receives the information from the Internet and stores it in a local file on client 112. Requests to read data from the program which initiated the open of the URL are handled in a similar manner as "reads" operations from any other file, are handled. However, the accessed file (which has a temporary name that is automatically assigned and is most probably different than the URL) contains the data downloaded from the accessed URL. The application program is permitted to read the data simultaneously with the downloading of the data. However, if the application reaches the end of the data in the temporary file before all of the downloaded data is received, the application is stalled until further data is downloaded. An existing file locking (semaphore) system in the operating system is used to accomplish this serialization.

This methodology works in a simple way with read operations. However, when the application attempts to write to the URL, the application may not be permitted to modify the content of the URL. In these situations, an indication is returned from the write operation which informs the application that writing to this URL is prohibited. This is accomplished using the same methods as are used for a local file marked as a "read-only" file.

Alternatively, some protocols may allow the contents of the URL, to be updated. For example, client 112 may be permitted to replace a file obtained using the FTP protocol. In this situation, the file is downloaded for reading as with any other URL. However, when the application writes to the file, the application modifies the temporary file created in a manner described above. When the URL is closed, the operating system uses the FTP protocol to transfer the modified temporary file back to the server to replace the original file, before discarding the temporary file.

Writing to an Internet file may also be permitted is for the TELNET protocol. The data written to the URL is sent to the server and interpreted by the server as TELNET commands sent by client 112. In this scenario, access to the URL is performed in a similar manner to a file access to the CON device (console).

After the requested information is received, CPU 210 provides the appropriate data and control signals to close the socket in a step 316. At that point, CPU 210 selectively caches the received data in one of RAM 214 or disk drives 220 and 240 in step 318.

Figure 3:
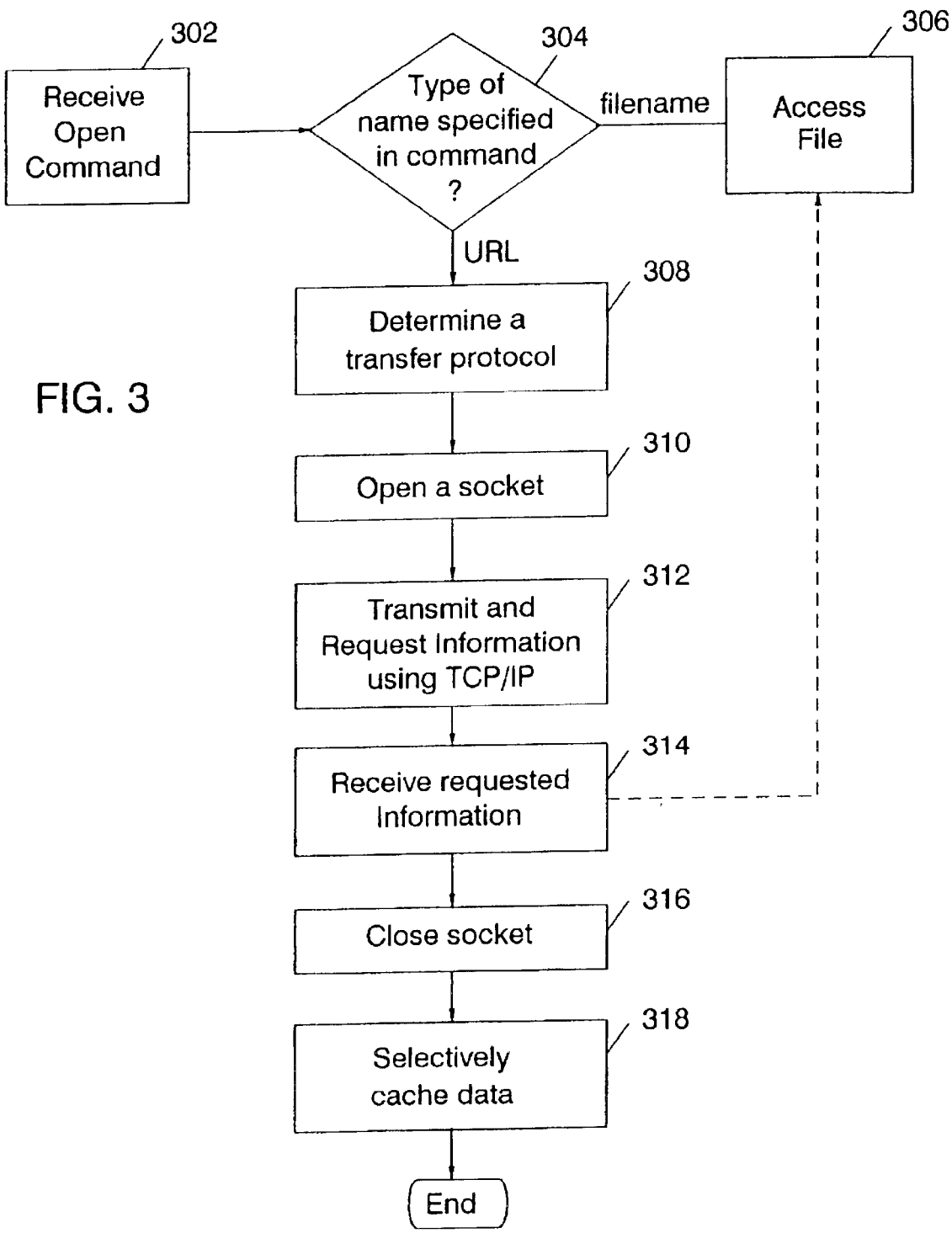
FIG. 3 illustrates, in flowchart form, a methodology implemented in accordance with one embodiment of the present invention.

By using the methodology described in FIG. 3, the present invention implements a data processing system and method that treats the URL as a file within the file system of a user data processor. To the external user of data processing system 200, the specification of a URL and the specification of a file local to data processing system 200 appear to be the same. Additionally, programmers of data processing system 200 may more easily implement programs within data processing system 200 in the communication network of FIG. 1 as the software developers are not required to use for different programming interfaces depending upon a file type desired to be accessed.

In summary, the present invention implements this functionality by making files from the Internet accessible in the same manner as the files are accessible from a local hard drive of a personal computer. Stated another way, the present invention supports access to the Internet using the same API's (open, read, write, and close) as are used for files and devices. Thus, an application implemented in a data processing system or with a method of the present invention may access Internet data without using different software code. Instead, the operating system of the data processing system, which implements the API's is modified to automatically handle the retrieval and access of Internet data. Thus, the details of whether the data retrieved is a file from a local hard drive or a file from the Internet is handled transparently as far as the user and the application are concerned. For this reason, an application programmer is required to draft less code to handle such situations.

Furthermore, as described herein, it should be noted that while the present invention is particularly applicable to data being read from the Internet, the methodology of the present invention may also be used to modify files on the Internet in a similar manner to which files are modified on a user's data processing system. In this situation, the software developer or user would use an FTP protocol to transfer data to a web site when the web site was accessed in accordance with the methodology specified herein. In such a situation, it may be useful to include a file locking mechanism, such that only one person may access a file when that person is writing new data to the file. Thus, corrupted data would not be accessed and used by others in the communication network.

It should be noted that the description provided herein is but one example of an implementation of the present invention. It should be noted that many additional implementations may also be utilized to realize the present invention. While there have been described herein the principles of the invention, it is to be clearly understood to those skilled in the art that this description is made by way of example only and not as a limitation to the scope of the invention. Accordingly, it is intended, by the appended claims, to cover all modifications of the invention which fall within the true spirit and scope of the invention.

What is claimed is:

1. A computer program product in a computer readable medium comprising:
    an operating system on a local data processing system, said operating system comprising:
        input means for receiving a command to access a first file;
        means for evaluating the command to determine a first type of the first file; and
        means for retrieving the first file from a remote data processing system when the first file type indicates the first file is stored outside the local data processing system.

2. The computer program product of claim 1, wherein the first file is retrieved from the remote data processing system when the command specifies a uniform resource locator.

3. The computer program product of claim 2, wherein a portion of the uniform resource locator specifies the remote data processing system.

4. The computer program product of claim 2, wherein the uniform resource locator indicates a transfer protocol for communicating the first file from the remote data processing system to the local data processing system.

5. The computer program product of claim 4, wherein the transfer protocol is a hypertext transfer protocol.

6. The computer program product of claim 1, wherein the means for retrieving the first file from the remote data processing system, further comprises:

means for opening a socket to communicate between the local data processing system and the remote data processing system;

means for selectively communicating a first plurality of data values between the local data processing system and the remote data processing system; and means for closing the socket between the local data processing system and the remote data processing system.

7. The computer program product of claim 1, wherein at least one of a plurality of data values corresponding to the first file is modified by the local data processing system to generate a modified data value.

8. The computer program product of claim 7, further comprising:

means for transmitting the modified data value to the first file in the remote data processing system using a transfer protocol.

9. The computer program product of claim 8, wherein the transfer protocol is a file transfer protocol.

10. A data processing system, comprising:

a communication interface for selectively enabling the data processing system to communicate with a remote data processing system;

a local memory;

input means for receiving a command to access a first file; and a central processing unit for executing an operating system, wherein the operating system evaluates the command to determine when the first file is stored in the local memory and when the first file is stored in the remote data processing system.

11. The data processing system of claim 10, wherein the operating system determines that the first file is stored in the remote data processing system when the command specifies a uniform resource locator.

12. The data processing system of claim 11, wherein a portion of the uniform resource locator specifies the remote data processing system.

13. The data processing system of claim 11, wherein the remote data processing system is coupled to the data processing system via an Internet communication network.

14. The data processing system of claim 11, wherein the uniform resource locator indicates a transfer protocol for communicating the first file from the remote data processing system to the data processing system.

15. The data processing system of claim 14, wherein the transfer protocol is a hypertext transfer protocol.

16. The data processing system of claim 10, wherein the operating system enables the communication interface to open a socket to communicate between the local data processing system and the remote data processing system, to selectively communicate a first plurality of data values between the local data processing system and the remote data processing system, and to close the socket between the local data processing system and the remote data processing system.

17. The data processing system of claim 10, wherein at least one of a plurality of data values corresponding to the first file is modified by the data processing system to generate a modified data value.

18. The data processing system of claim 17, wherein the operating system enables the communication interface to transmit the modified data value to the first file in the remote data processing system using a transfer protocol.

19. The data processing system of claim 18, wherein the transfer protocol is a file transfer protocol.

20. A method implementing an operating system on a local data processing system, comprising the steps of:

receiving a command to access a first file;

evaluating the command to determine a first type of the first file; and retrieving the first file from a remote data processing system when the first file type indicates the first file is stored outside the local data processing system.

21. The method of claim 20, wherein the first file is retrieved from the remote data processing system when the command specifies a uniform resource locator.

22. The method of claim 21, wherein a portion of the uniform resource locator specifies the remote data processing system.

23. The method of claim 21, wherein the uniform resource locator indicates a transfer protocol for communicating the first file from the remote data processing system to the local data processing system.

24. The method of claim 23, wherein the transfer protocol is a hypertext transfer protocol.

25. The method of claim 20, further comprising the steps of:

opening a socket to communicate between the local data processing system and the remote data processing system;

selectively communicating a first plurality of data values between the local data processing system and the remote data processing system; and closing the socket between the local data processing system and the remote data processing system.

26. The method of claim 20, further comprising the step of:

modifying at least one of a plurality of data values corresponding to the first file is modified by the local data processing system to generate a modified data value.

27. The method of claim 26, further comprising the step of:

transmitting the modified data value to the first file in the remote data processing system using a transfer protocol.

28. The method of claim 27, wherein the transfer protocol is a file transfer protocol.

* * * * *